June 16, 1959     I. H. PARKER     2,890,711
SELF-CENTERING FUEL CONTROL VALVE FOR CARBURETORS AND THE LIKE
Filed April 10, 1956
Fig. 1.
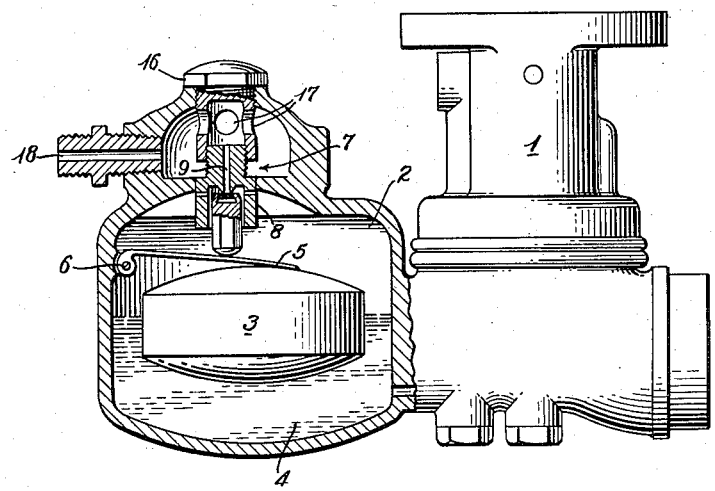
Fig. 2.     Fig. 3.
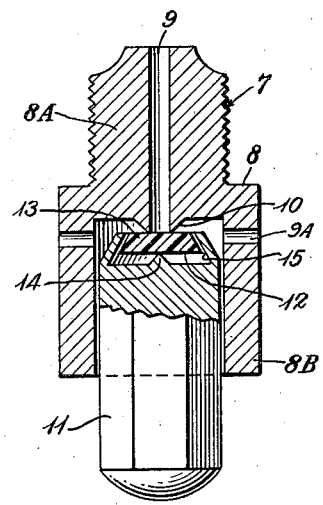 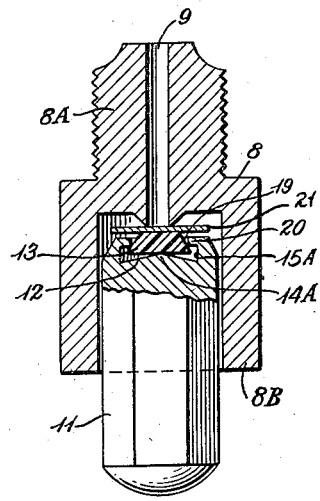
INVENTOR
*Irven Hagy Parker*
BY *Stevens, Davis, Miller & Mosher*
ATTORNEYS

United States Patent Office

2,890,711
Patented June 16, 1959

2,890,711

SELF-CENTERING FUEL CONTROL VALVE FOR CARBURETORS AND THE LIKE

Irven Hagy Parker, Tulsa, Okla.

Application April 10, 1956, Serial No. 577,277

3 Claims. (Cl. 137—434)

This invention relates to carburetors for internal combustion engines, and more particularly to a novel valve assembly for use in conjunction therewith.

In modern-day internal combustion engines, the high input fuel pressures which are commonly used have caused the necessity for sturdy efficient valves to become very obvious. More particularly, the need for an improved type of carburetor fuel control valve which eliminates the undesirable characteristics of conventional needle valve assemblies has become acute.

As is well-known to those skilled in the art, such fuel control valves are employed in conjunction with a buoyant float member disposed within the float chamber of a carburetor, in order to maintain a constant fuel level within the chamber. It will be appreciated in this connection that accurately holding the fuel level is one of the most important functions which the carburetor is called upon to perform.

In prior art devices, a conventional needle valve assembly has been utilized to regulate the flow of the fuel between the fuel pump and the float chamber of the carburetor. These assemblies generally include a main body provided with an elongated orifice extending therethrough. The orifice generally terminates in a transverse flat surface to provide a seat. The flow of fuel through the orifice may be wholly or partially interrupted by the conical shaped end portion of a valve plunger. The conical shaped end portion penetrates the orifice, and may actually engage the periphery thereof. The relative positioning of the conical shaped portion with respect to the periphery of the orifice is, of course, controlled by the buoyant float member within the float chamber of the carburetor.

The conventional type of needle valve assembly just described is characterized by certain serious deficiencies. For instance, the impact of the metal-to-metal contact between the conical shaped portion and the periphery of the orifice results in very rapid wear and deformation of these parts. Thus, the high fuel pressure required in present-day high compression engines causes early failure of both the valves and the seats of such assemblies.

Additionally, the relatively large reduction which is required in the fuel level before the conical portion can properly disengage the seat causes an extremely substantial reduction in the engine efficiency at high speeds. At such speeds, when the demand for fuel is relatively high, the level of fuel within the float chamber must drop very low before the conical end portion can emerge far enough out of the orifice to permit sufficient fuel to enter the carburetor. This fuel starvation causes the engine to "lean out" at the higher speeds and results in extremely poor performance and engine efficiency. The tendency of this condition to cause burnt valves, and the like, is well-known to those skilled in the art.

The inability of most conventional needle valve assemblies to hold high fuel pump pressures when the pump valves are incapable of "leaking back" is another characteristic of such valves which has caused dissatisfaction. The method by which the present invention readily holds such high pressures will be explained later in this specification.

The present invention contemplates an ingenious fuel control valve which utilizes principles entirely different from those employed in conventional needle valves, and which thus eliminates all of the undesirable characteristics associated with such units.

More particularly, the present invention contemplates a novel valve structure which holds high fuel pressures efficiently, and maintains the fuel level in the float chamber within very close limits. The fuel control valve disclosed in this specification is characterized by the ability to withstand high fuel pump pressures for an indefinite period during those intervals when the motor is stopped, regardless of the duration of such intervals. Thus, it is possible to eliminate the hard starting and increased wear on motor parts and battery which often result from flooding the motor while it is hot.

With the present invention the area of the fuel feed orifice may be substantially reduced to less than one-half of the required orifice size in the main body of a conventional needle valve assembly. As a result, the amount of force needed to hold the valve closed and withstand a given fuel pump pressure is decreased to less than one-half the previously required value. The consequent improvement in sensitivity and response speed is believed obvious. When the plunger of the present invention recedes downwardly by a minute amount, the entire area of the fuel feed orifice is uncovered and the engine cannot be subjected to the "leaning out" or fuel starving process earlier referred to in connection with conventional needle valve assemblies. Unusually efficient high-speed operation is thus assured. Since extremely small displacements of the valve plunger of the present invention are sufficient to effect a leakproof closure, the valve is characterized by the ability to hold and withstand unusually high fuel pump pressures. Coupled with the advantages already set forth is the fact that the resilient engagement of the elements of the instant invention eliminate the "leak through" which is characteristic of worn needle valves. Thus the longevity of the valve assembly is increased almost indefinitely, and the necessity for periodic replacements is substantially eliminated.

Accordingly, therefore, a primary object of the present invention is to provide a valve assembly which eliminates flooding by providing a positive cutoff in the input fuel supply when the motor is stopped.

Another object of this invention is to provide a fuel control valve for a carburetor in which extremely small variations in the fuel level within the carburetor are sufficient to energize the valve between the "full off" and "full on" position.

Another object of the present invention is to provide an improved carburetor fuel supply valve which is characterized by extremely efficient performance and highly economical operation.

Another object of this invention is to disclose a novel valve assembly for a carburetor which is characterized by a minimum of wear and deformation of the mating parts.

Another object of this invention is to provide a readily marketable replacement kit for carburetor control valves which will include a main body, a valve plunger with a resilient insert, and an ingenious spacer disc for setting the float level of the fuel to manufacturer's specifications.

A further object of the present invention is to teach a novel valve structure which is so designed and constructed as to provide positive engagement and disengagement irregardless of the position in which it is mounted.

A still further object of the present invention is to disclose a novel method and apparatus for controlling the input fuel flow to the fuel mixing means used in conjunction with internal combustion engines.

Other objects of the present invention will become evident by reference to the following detailed description and drawings in which like numerals indicate like parts and in which:

Figure 1 illustrates one form of the preferred embodiment of the invention installed in a conventional carbureter.

Figure 2 illustrates an enlarged sectional view of the embodiment of the invention shown in Figure 1.

Figure 3 illustrates a modified form of the invention and shows the use of a spacer disc which may be employed with either embodiment of the invention for setting the float level within the carburetor.

Turning now to the drawings, and more particularly to Figure 1 thereof, the numeral 1 indicates generally a conventional carburetor shown partly in section. In the portion of the carburetor 1 which is broken out the numeral 2 depicts the float chamber of the carburetor. Within the float chamber 2 there is provided a buoyant float member 3 partially submerged with a supply of fuel 4. The buoyant float member 3 within the float chamber 2 rises and falls in accordance with the level of the fuel located within the float chamber. The float member 3 is provided with a leaf 5 which is affixed at one end to the float member 3, and pivotally secured at the opposite end to a pin 6 which is mounted in the wall of the float chamber. The changes in the level of the fuel within the float chamber 2 cause the vertical position of float member 3 to change. Consequently, the pivotal motion of the leaf 5 about the pin 6 also reflects changes in the fuel level.

Above the leaf 5, the numeral 7 indicates generally one form of the preferred embodiment of the invention. This embodiment, as shown most clearly in Figure 2, includes a main body 8 provided with a fuel feed orifice 9 axially disposed through the upper portion 8A. The lower portion of the orifice 9 terminates in a chamfered annular valve seat 10. As used in this context, the word "chamfered" taken in connection with the drawings will be understood to mean that an annular rim of extremely small area is provided as a valve seating surface. Immediately below the annular valve seat 10 and substantially concentric therewith there is provided a valve plunger 11. The plunger 11 may be fabricated from stock which has a polygonal cross-sectional area. If desired, the plunger 11 may be readily fabricated from hexagonal or octagonal bar stock. The corners of the plunger 11 slidably engage the enlarged inner bore of the lower portion 8B of the body 8. The lower portion 8B includes a set of orifices 9A which extend horizontally therethrough. It will be appreciated that a circular cross section may be employed equally well for the plunger 11, if axial slots or flutes or the like are provided for the fuel to travel through to the float chamber. The lower portion of the valve plunger 11 may be provided with a rounded surface, as shown in the illustrations of the invention. In the upper portion of the valve plunger 11 there is provided a flat circular insert 12. It will be observed that the insert 12 is provided with an axially bevelled periphery 13. In other words, the peripheral surface of the circular insert 12 is provided with an axially divergent surface, as viewed toward the valve plunger 11. The insert 12 may be composed of a suitable synthetic or composition material which is impervious to attack from the fuel. The material selected should possess sufficient resiliency so that a positive cutoff in the flow of fuel is effected by virtue of a very slight upward pressure on the plunger 11. A material such as that identified by the trade name "Hycar" has been found to yield excellent results. Hycar is defined as a registered trade name of the B. F. Goodrich Company, and is used to designate various types of American made rubber. Handbook of American Trade Names, 1952 edition, p. 283; published by Industrial Research Service, Dover, New Hampshire. The material for the insert 12 should be characterized by compliant readily deformable properties comparable to such a material. Directly beneath the insert 12 there is provided a conical point 14. The conical point 14, as seen in Figure 2, is integral with the remainder of the valve plunger 11.

It will be observed that the insert 12 is encased within, and nests in a uniquely shaped space within the plunger 11. The end-walls of plunger 11 form an overhanging shoulder which defines a recess in the end of the plunger. More particularly, the axially divergent surfaces of the inner wall sections 15 provide a circular recess with a dovetail cross section within the plunger 11.

In operation, the leaf 5 which is affixed to the float member 3 engages the rounded lower end of the plunger 11 and controls the degree of engagement of the insert 12 with the chamfered annular valve seat 10.

The method by which the valve assembly is secured within the carburetor itself is shown most clearly in Figure 1. More particularly, the main body 8 is provided with a plurality of conventional threads on the outer periphery of its upper portion 8A. The threads on upper portion 8A are engaged by a mating set of threads in the removable cap 16. It will be observed that the removable cap 16 is provided with a hollow internal bore. This bore registers with a plurality of axially spaced transverse holes 17, substantially as shown in Figure 1. The supply of fuel which is received from the fuel pump, via the orifice 18, is permitted to flow through the holes 17 and penetrate the fuel feed orifice 9 in the main body 8. Of course, the quantity and rate at which fuel which is allowed to enter the float chamber is effectively controlled by the degree of engagement of the insert 12 with the annular valve seat 10. Because of the conical point 14, the insert 12 is substantially full floating. This causes the self-centering action which contributes so markedly to the advantages of the present invention explained above. The insert 12 will automatically rock over and engage the chamfered seat 10 at all times when pressure is applied to plunger 11. The valve, being of the poppet type in which a flat valve means engages a parallel opening, is characterized by fast response speeds. A very small displacement of the plunger provides an area for fuel entry which is equal to the entire cross-sectional area of the orifice 9. This permits the use of substantially smaller orifices than was previously thought possible, and allows plunger actuation with substantially reduced amounts of force.

Turning now to Figure 3, there is illustrated a modified form of the self-centering valve assembly shown in Figure 2.

The valve plunger 11 may again comprise a member having a polygonal cross section, and provided with a rounded lower end portion. The upper end of the plunger 11 is again adapted to retain a flat circular insert 12 with a bevelled peripheral surface. However, the mode of retention is different from that shown in Figure 2. More particularly, support is provided by a conical point 14A which defines the entire bottom surface of the recess within plunger 11. Two circular bores of varying diameter provide further boundaries to the recess. The first circular bore 15A extends axially downward to meet with the outer periphery of the conical point 14A. The second circular bore 19 is concentric with bore 15A and of reduced diameter with respect thereto. Bores 15A and 19 together define an overhanging annular shoulder, or ledge 20 which provides a retention for the insert 12. The large-diameter surface of insert 12 nests within the first circular bore 15A. The small-diameter surface of insert 12 emerges from, and is located outside the plunger 11. The annular ledge 20 overhangs the large-diameter surface of the insert, and prevents its escape from the uniquely shaped recess within the plunger 11.

In other words, the annular ledge 20 overhangs the periphery of the bevelled insert 12 for the purpose of caging the insert within the recess of the plunger.

The modified embodiment shown in Figure 3 is installed in a conventional carburetor in the same manner as that taught for the valve assembly in Figure 2. It will be observed that the fundamental distinction between the two valves resides in the structural details of the retention for the insert.

In Figure 3, the application of a spacer disc 21 is shown. While the disc 21 is illustrated only in conjunction with Figure 3, it will be appreciated that it may be employed equally well with the embodiment shown in Figure 2. The spacer disc 21 may be composed of cardboard, plastic, or other inexpensive material and is characterized by a predetermined thickness.

For setting the float level within the float chamber, the spacer disc 21 is physically interposed between the insert 12 and the annular chamfered valve seat 10 while making the adjustment. The use of the disc 21 permits an extremely accurate and simple adjustment of the float level within the carburetor, and makes it possible for an unskilled artisan to quickly set the level to manufacturer's specifications. Then, once the desired adjustment is achieved, the spaced disc 21 may be removed and discarded.

Where the novel valve assembly of this invention is manufactured and provided as a replacement kit for conventional needle valves, it is contemplated that a spacer disc of the required thickness will accompany each such kit and form an integral part thereof.

While, therefore, I have disclosed my invention in full and concise terms as required by the statute, it will be obvious that many substitutions, alterations and modifications may be made therein without departing from the spirit and scope of the appended claims.

What is claimed is:

1. In a fuel control mechanism for automatically regulating the fuel level within a fuel atomizing device provided with a buoyant float member, a main body having an upper portion with an orifice axially extending therethrough and a lower portion defining an inner bore which communicates with said orifice, a chamfered annular valve seat forming a part of said body and extending therefrom to define an annular valve seating surface of extremely small area in the fuel egress plane of said orifice; a plunger slidably disposed within said inner bore to receive thrust from said buoyant member, said plunger provided with end walls which form an overhanging shoulder to define a recess in one end of said plunger, and a conical point extending upwardly from the floor of said recess; and a bevelled circular disc of compliant material caged within said recess and pivotally supported upon said conical point.

2. A fuel control mechanism as recited in claim 1 in which said overhanging shoulder defines inwardly inclined end-walls which provide a circular dove-tailed recess.

3. A fuel control mechanism as recited in claim 1 in which said shoulder defines an annular ledge which overhangs the periphery of said bevelled disc.

References Cited in the file of this patent

UNITED STATES PATENTS

| | | |
|---|---|---|
| 372,641 | Robertshaw | Nov. 1, 1887 |
| 1,763,927 | Ireland | June 17, 1930 |
| 1,773,110 | Meyers | Aug. 19, 1930 |
| 1,787,601 | Swanberg | Jan. 6, 1931 |
| 2,752,937 | Hieger | July 3, 1956 |

FOREIGN PATENTS

| | | |
|---|---|---|
| 30,043 | France | Oct. 6, 1925 |

(Addition to No. 444,102)